(12) United States Patent
Obendiek

(10) Patent No.: US 7,261,363 B2
(45) Date of Patent: Aug. 28, 2007

(54) DEVICE FOR COVERING A TRUNK OF A MOTOR VEHICLE

(75) Inventor: Klaus Obendiek, Passau (DE)

(73) Assignee: Edscha Cabrio-Dachsysteme GmbH, Hengersberg (DE)

( * ) Notice: Subject to any disclaimer, the term of this patent is extended or adjusted under 35 U.S.C. 154(b) by 302 days.

(21) Appl. No.: 11/122,171

(22) Filed: May 4, 2005

(65) Prior Publication Data
US 2005/0248177 A1    Nov. 10, 2005

(30) Foreign Application Priority Data
May 10, 2004 (DE) .................... 10 2004 023 614

(51) Int. Cl.
*B60J 7/00* (2006.01)
(52) U.S. Cl. .............. 296/107.08; 296/76; 296/136.06
(58) Field of Classification Search ........... 296/107.08, 296/76, 136.05, 136.06; 49/192, 280
See application file for complete search history.

(56) References Cited

U.S. PATENT DOCUMENTS

| | | | |
|---|---|---|---|
| 5,655,331 A | 8/1997 | Schrader et al. | 49/280 |
| 6,270,144 B1 | 8/2001 | Schenk | 296/107.08 |

FOREIGN PATENT DOCUMENTS

| | | |
|---|---|---|
| DE | 3626747 | 2/1988 |
| DE | 195 16 876 | 11/1996 |
| DE | 199 10 763 | 7/2000 |
| DE | 299 16 002 | 3/2001 |
| DE | 299 16 003 | 4/2001 |
| EP | 1 084 883 | 6/2004 |
| EP | 1 084 885 | 6/2004 |

*Primary Examiner*—Joseph D Pape
(74) *Attorney, Agent, or Firm*—Davidson, Davidson & Kappel, LLC

(57) ABSTRACT

A device for covering a trunk of a motor vehicle, the device comprises a trunk lid movable relative to a body of the vehicle, a force transmission unit for driving the movement of the trunk lid, a fastening element for releasably securing the trunk lid in a closed state of the trunk lid, wherein the force transmission unit drives the movement of the trunk lid, and wherein the force transmission unit drives the movement of the fastening element between an open and a closed state, wherein the fastening element is connected by a link gear mechanism to the force transmission unit, and wherein the link gear mechanism, in a closed state of the fastening element, is disposed in an over-center position.

22 Claims, 6 Drawing Sheets

DEVICE FOR COVERING A TRUNK OF A MOTOR VEHICLE

Priority is claimed to German Patent Application DE 10 2004 023 614.3, filed on May 10, 2004, the entire disclosure of which is incorporated by reference herein.

BACKGROUND OF THE INVENTION

The present invention relates to a device for covering a trunk of a motor vehicle, in particular to a device comprising a trunk lid movable relative to a body of the vehicle, a force transmission unit for driving the movement of the trunk lid, and a fastening means for releasably securing the trunk lid in a closed state of the trunk lid.

In modern-day automotive construction, especially the building of convertibles, there is an increasing call for automatic swing-open cover elements to be provided for the body. Of particular importance in this regard is a simple and robust construction which can be cheaply produced in large batch quantities and works reliably over a long service life.

German patent DE 199 10 763 C1 describes a device for opening and closing a tailgate, in which the tailgate can be swiveled open and shut by means of a hydraulic cylinder, the hydraulic cylinder being mounted over a long hole, so that a pickoff of a movement of the hydraulic cylinder in the long hole by means of Bowden cables is used to actuate a lock of the tailgate, indirectly through the hydraulic cylinder. Such a mechanism is not very robust, is complex and is prone to breakdown, at least over a long service life.

DE 299 16 003 U1 describes as fastening means of a trunk cover for a motor vehicle a lock element having a catch hook which, in a closed position of the cover configured as a lid part, embraces a bolt fixed to the body and, in this way, releasably secures the lid part. The catch hook is actuated by a pull-and-push linkage, which acts upon a lever close to the catch hook in order to rotate the catch hook about its axis. The linkage thus acts with the lever in the style of a link rod for the fastening means. The linkage is drive-connected by means of a bolt guided in a keyhole connecting link and forming the end region of a piston rod of a force transmission unit configured as a drive means. However, the drive does not act directly upon the linkage, but only indirectly, via the guidance of the bolt in the long hole of the keyhole connecting link. A drawback is that the coupling between the force transmission unit and the fastening means comprises a large number of individual parts. Also disadvantageous is the fact that the guidance of the bolt in the long hole of the keyhole connecting link is susceptible to wear and prone to noise generation. Another drawback is that forces which act upon the lid part from outside are conveyed directly to the force transmission unit and can damage this. The described coupling between the force transmission unit and the fasting means comprises a lot of single elements and is applicable only for specific configuration, which renders an upgrading of arbitrary trunk lids difficult to accomplish. Referred to as a further lock is a keyhole connecting link having a neck region and a widened head region in which the bolt of the piston rod of the drive member is guided, which keyhole connecting link cannot be used to secure the lid part releasably to the body.

German utility model DE 299 16 002 U1 describes a trunk lid, configured as a lid part, for covering a trunk of a motor vehicle, the lid part being able to be brought, by means of a force transmission unit configured as a drive member, especially by means of a hydraulic cylinder, into two different opening positions, a multi-bar arrangement having four parts, especially four links of a four-bar mechanism, being assigned to a front end region of the lid part. For the securement of the lid part, a locking element is provided, which is configured as a mechanical lock integrated into the hydraulic cylinder. The lock integrated into the hydraulic cylinder is not, however, connected to the lock by a link connection. A drawback with this is that external forces acting upon the secured lid part are transmitted directly to the hydraulic cylinder and can hence damage the mechanism as a whole or the hydraulic cylinder. A lock which is configured in the style of a pivot latch and is operatively connected to the drive member secures the four parts, especially the four mutually coupled links of a multi-bar mechanism, in order to allow a first open position. The lock is not designed to secure the lid part on the body, since the lid part can be opened even when the lock is closed.

German patent application DE 36 26 747 A1 describes, as a baggage compartment cover being used as a trunk lid, which can be secured to a body by means of a fastening means, the fastening means comprising a body-fixed closing part, the web of which is gripped by a fork-like companion closing part fastened to the baggage compartment cover. A force transmission unit is formed as a piston rod of a push-out tool configured as a hydraulic cylinder. The push-out tool acts via a continuation and a bearing journal directly upon a two-armed clamping lever, the U-shaped end of which forms the companion closing part. Between the fastening means and the force transmission unit, a direct action of the force transmission unit both upon the fastening means and upon the trunk lid is possible without the need for a link gear mechanism.

German patent DE 195 16 876 C1 describes a supporting frame configured as a trunk lid, which can be transferred by means of a drive of a force transmission unit, which drive is configured as a hydraulic cylinder, into a fastening position in which the supporting frame can be releasably secured by means of a fastening means configured as a snap fastening, which comprises a pivot latch fastening and a fastening stud part cooperating therewith. The hydraulic cylinder acts directly upon the supporting frame, a cable pull being provided at a foot of the hydraulic cylinder as a coupling with a trip lever of the pivot latch fastening. A cable pull is provided as a connection between the fastening means and the force transmission unit. A drawback with the cable pull is that this is not very robust and is susceptible to wear in the course of lengthy operation. The foot of the hydraulic cylinder is guided by means of a bolt in a long hole, whereby the cable pull is attached to the bolt. When the hydraulic cylinder is actuated, first the bolt is shifted along the long hole to one end thereof and is fixed by spring elements at the first end of the long hole. In a second step, upon further linear movement of the piston rod of the hydraulic cylinder, the trunk lid can be moved. It is a drawback that a portion of the movement of the hydraulic cylinder is need to merely actuate the locking means, which necessitates that a comparatively long hydraulic cylinder has to be provided. As a further drawback, a voluminous hydraulic cylinder has to be used. Furthermore, it is not ensured that forced acting on the trunk lid are transmitted to the hydraulic cylinder. It is a still further disadvantage, that the hydraulic cylinder is secured only be means of the spring elements; as a consequence, the arrangement is prone to malfunction. Finally, the arrangement comprises a multitude of elements and requires a long hole, rendering the arrangement difficult to upgrade for a given trunk lid.

SUMMARY OF THE INVENTION

It is an object of the invention is to provide a device which comprises a simple and robust mechanism for the simultaneous pivoting and fastening of the trunk lid.

It is a further object of the invention to provide a device which is easy to apply in the course of an upgrade and which is irrespective of the specific configuration of the force transmission unit driving the trunk lid.

It is a still further object of the invention to provide a device which ensures that forces acting upon the closed trunk lid are reliably countered and, in particular, do not affect the force transmission unit.

According to a first aspect of the invention, these and other objects are achieved by a device for covering a trunk of a motor vehicle, the device comprising a trunk lid movable relative to a body of the vehicle, a force transmission unit for driving the movement of the trunk lid, a fastening means for releasably securing the trunk lid in a closed state of the trunk lid, wherein the force transmission unit drives the movement of the trunk lid, and wherein the force transmission unit drives the movement of the fastening means between an open and a closed state, wherein the fastening means is connected by a link gear mechanism to the force transmission unit, and wherein the link gear mechanism, in a closed state of the fastening means, is disposed in an over-center position.

According to a second aspect of the invention, these and other objects are achieved by a device for covering a trunk of a motor vehicle, the device comprising a trunk lid movable relative to a body of the vehicle, a force transmission unit for driving the movement of the trunk lid, a fastening means for releasably securing the trunk lid in a closed state of the trunk lid, wherein both the fastening means and the movement of the trunk lid can be driven by means of the force transmission unit, wherein the fastening means is connected by a link gear mechanism to the force transmission unit, and wherein a lever of the link gear mechanism is articulately attached at a first support point to the force transmission unit.

By connecting the fastening means to the force transmission unit by the link gear mechanism, it is ensured that the mechanism of the device according to the invention is particularly robust and durable.

If the fastening means is disposed in the closed state in an over-center position, it can easily be ensured that forces acting upon the closed trunk lid are reliably countered and, in particular, do not affect the force transmission unit.

In a preferred embodiment of a device according to the invention, the fastening means comprises a pivot latch, a catch bar connected to the trunk lid being able to be brought into engagement with the pivot latch. In a particularly preferred arrangement, the force transmission unit is a linear drive cylinder, the drive cylinder being articulately attached at a first support point to the pivot lever, in which case it is also preferable for the fastening means to be connected by a control link to the pivot lever. High retaining forces can thereby be attained in a simple manner, the overall cost of the mechanism according to the invention being kept low.

It is further advantageously envisioned that the force transmission unit is articulately connected at a second support point to a first drive link for driving the movement of the trunk lid. In a particularly preferred arrangement, a second drive link is articulately connected at one end to the first drive link and at the other end to the trunk lid. In a further preferred arrangement, the trunk lid is connected in a hinge joint to the body of the vehicle, the body, the trunk lid, the first drive link and the second drive link together forming a four-bar mechanism. A pivotal movement of the trunk lid, even over a large pivot angle, can hereby easily be effected by means of a relatively small stroke of the force transmission unit.

In a further preferred arrangement, the fastening means is received on a bearing unit fixed to the body. Also preferably, the force transmission unit and, where appropriate, further parts of the device according to the invention can be received on this bearing unit, so that the device according to the invention can be realized, as a whole, in compact-built and modular configuration.

In a preferred refinement of a device according to the invention, the fastening means, in an at least partially open state of the trunk lid, is in an over-center position in relation to the force transmission unit. In this case, it is advantageous, in particular, if a catch bar of the trunk lid, in the course of a closing movement of the trunk lid, hits the fastening means, the over-center position of the fastening means, which position is assigned to the open state, being surmountable by the impact. This ensures that the fastening means, in the course of a closing movement of the trunk lid, remains in an open position until the trunk lid gets into a position in which a fastening of the trunk lid becomes necessary.

It is preferably envisioned that the device comprises no flexible pull means, in particular in the style of a Bowden cable. Parts are thereby avoided which might have a limited service life as a result of dirt contamination or wear.

In a preferred embodiment of a device according to the invention, the trunk lid is a folding-top compartment cover for covering an open convertible top. In particular, it can advantageously be envisioned here that the trunk lid can be pivoted, for opening purposes, counter to a direction of travel of the motor vehicle. Account is hereby taken of the fact that a device according to the invention can advantageously be used for modern convertible vehicles which are fully automated with respect to their movement.

Particularly advantageously, the folding-top is configured as a so-called "retractable hard top" and comprises at least two rigid shell parts, which can be displaced by means of a link rod between a mounted position and a position deposited in the trunk. Since the drive of the trunk lid covering the trunk and a drive of the folding-top, in particular of the "retractable hard top", are frequently coupled, irregularities in the movement of the folding-top can also affect the running of the trunk lid drive, particularly where the folding-top is of broadly rigid configuration. An over-center position of the link rod of the trunk lid here offers the advantage, largely divorced from irregularities in the movement of the folding-top, in particular of the "retractable hard top" of achieving an even and easily controllable movement of the trunk lid into its respective end position.

Further advantages and features of a device according to the invention will emerge from the embodiment described below.

BRIEF DESCRIPTION OF THE DRAWINGS

A preferred exemplary embodiment of a device according to the invention is described below and is explained in greater detail with reference to the attached drawings.

DETAILED DESCRIPTION OF A PREFERRED EMBODIMENT

Figure 1:
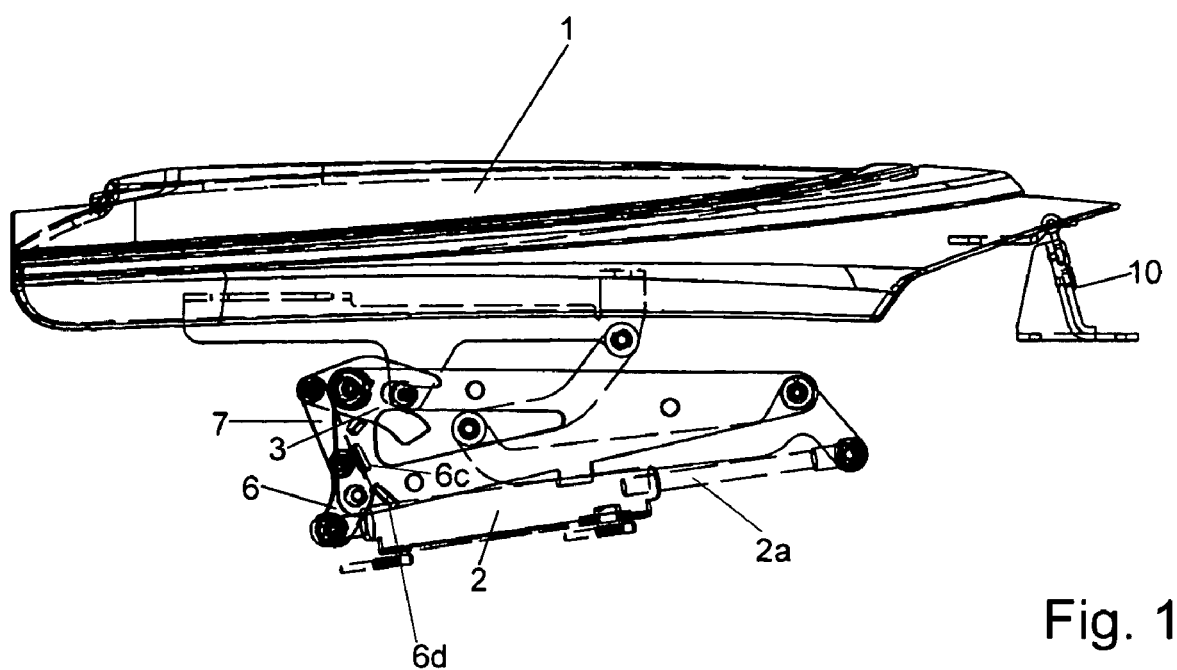
FIG. 1 shows a lateral top view of a preferred embodiment of a device according to the invention in a fully closed state.

The preferred exemplary embodiment of a device according to the invention comprises a trunk lid 1, which, in the present case, is configured as a convertible top compartment cover which is pivotable in its direction of opening counter to a direction of travel of the motor vehicle. The trunk lid 1 is connected by a hinge joint 10 to a body of the vehicle (not represented in detail).

In a front region of the trunk lid 1, viewed in the direction of travel, a catch bar 5 is located on a journal-like configuration of the trunk lid 1. The catch bar 5 can, in particular, be a simple roll or a steel bar.

In a rear-sided region of the trunk lid 1, a second drive link 9 is attached at one end in a second swivel joint 9a to the trunk lid 1. A first drive link 8 is articulately connected in a first swivel joint 9b to the other end of the second drive link 9. Distanced from the first swivel joint 9b, the first drive link 8 is movably connected in a swivel joint 8a to a bearing unit 11 secured to the body of the vehicle. The first drive link 8 reaches with a drive journal 8b beyond the swivel joint 8a of the connecting link. On the end side of the drive journal 8b, the end of a push rod 2a of a force transmission unit 2 configured as a hydraulic cylinder is articulately connected in a swivel joint 8c to the first drive link 8. At its opposite end, the hydraulic cylinder 2 is connected in a swivel joint 2b to a pivot lever 6, which is attached in a joint 6a to the bearing unit 11. The pivot lever 6 additionally has a swivel joint 6b, which lies opposite its swivel joint 2b with respect to the swivel joint 6a and in which a straight control link 7 is attached by its one end. The other end of the control link 7 is articulately connected in a swivel joint 3a to a pivot latch 3, which is likewise attached to the bearing unit 11 by a swivel joint 3b.

The pivot latch 3 has a jaw-like recess 3c, which, in terms of its dimensioning, is designed to cooperate with the catch bar 5. In particular, a lower guideway 3d of the recess 3c projects in such a way that the catch bar 5, in the course of a closing movement of the trunk lid 1, hits the guideway 3d.

The as-described preferred embodiment of the device according to the invention also shows that the body of the vehicle, the first drive link 8, the second drive link 9 and the trunk lid 1 form the four links of a four-bar mechanism.

Furthermore, the pivot latch 3 forms a fastening means for the trunk lid 1, since it can cooperate with the catch bar 5 of the trunk lid 1 and, in particular, is thereby able to secure the trunk lid 1. The fastening means 3 is here driven by the force transmission unit 2, the pivot lever 6 and the control lever 7 together forming a link gear mechanism 4, which connects the fastening means 3 to the force transmission unit 2.

The present invention now functions as follows:

In the fully closed position according to FIG. 1, the force transmission unit 2 configured as a hydraulic cylinder is fully extended. The pivot latch or fastening means 3 is in engagement with the catch bar 5, so that the trunk lid 1 is fastened. The pivot lever 6 is in this case located against a first stop 6c configured on the bearing unit 11. In addition, the pivot latch 3 is in an over-center position with respect to the effect of the control lever 7 on the pivot lever 6. A force acting upon the trunk lid 1 in the direction of opening (slipstream, vibration or similar) would therefore submit the pivot lever 6 to a torque in the direction of the stop 6c, so that the force transmission unit 2 is consequently not subjected to any force.

Figure 2:
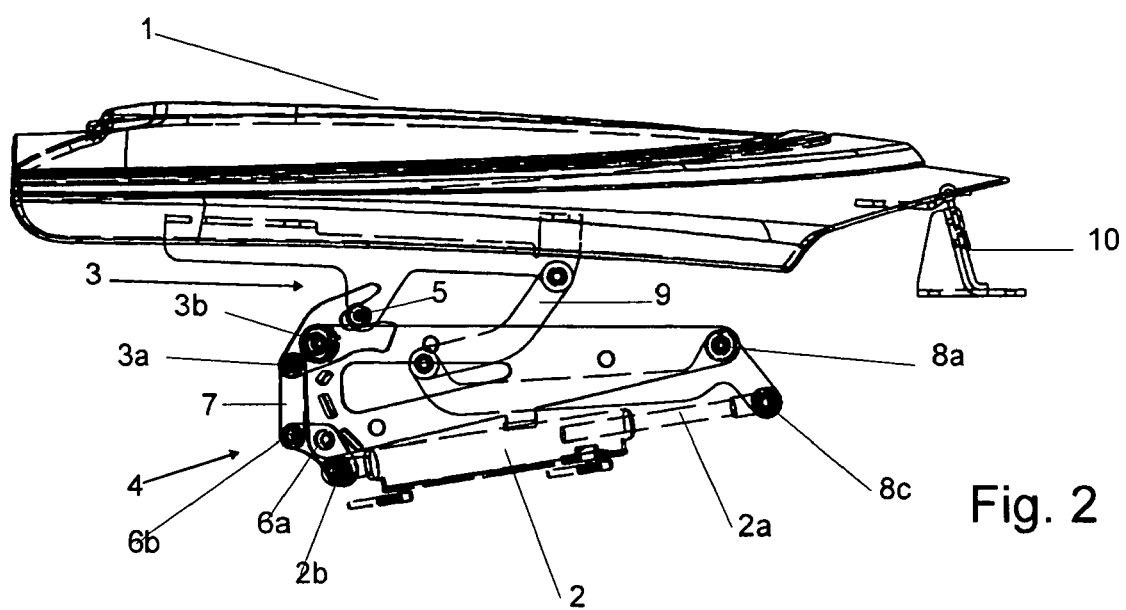
FIG. 2 shows the device from FIG. 1 in a first step of an opening movement.

In a first step of an opening movement, the force transmission unit 2 is now actuated such that the push rod 2a is retracted. Upon this, the pivot lever 6 is initially twisted in the counterclockwise direction in relation to the representation according to FIG. 1, so that the previously described over-center position of the closed state is surmounted. The further retraction movement of the push rod 2a leads to a rotation of the pivot latch 3 in the counterclockwise direction and thus to a release of the catch bar 5 (see FIGS. 2 and 3).

Figure 4:
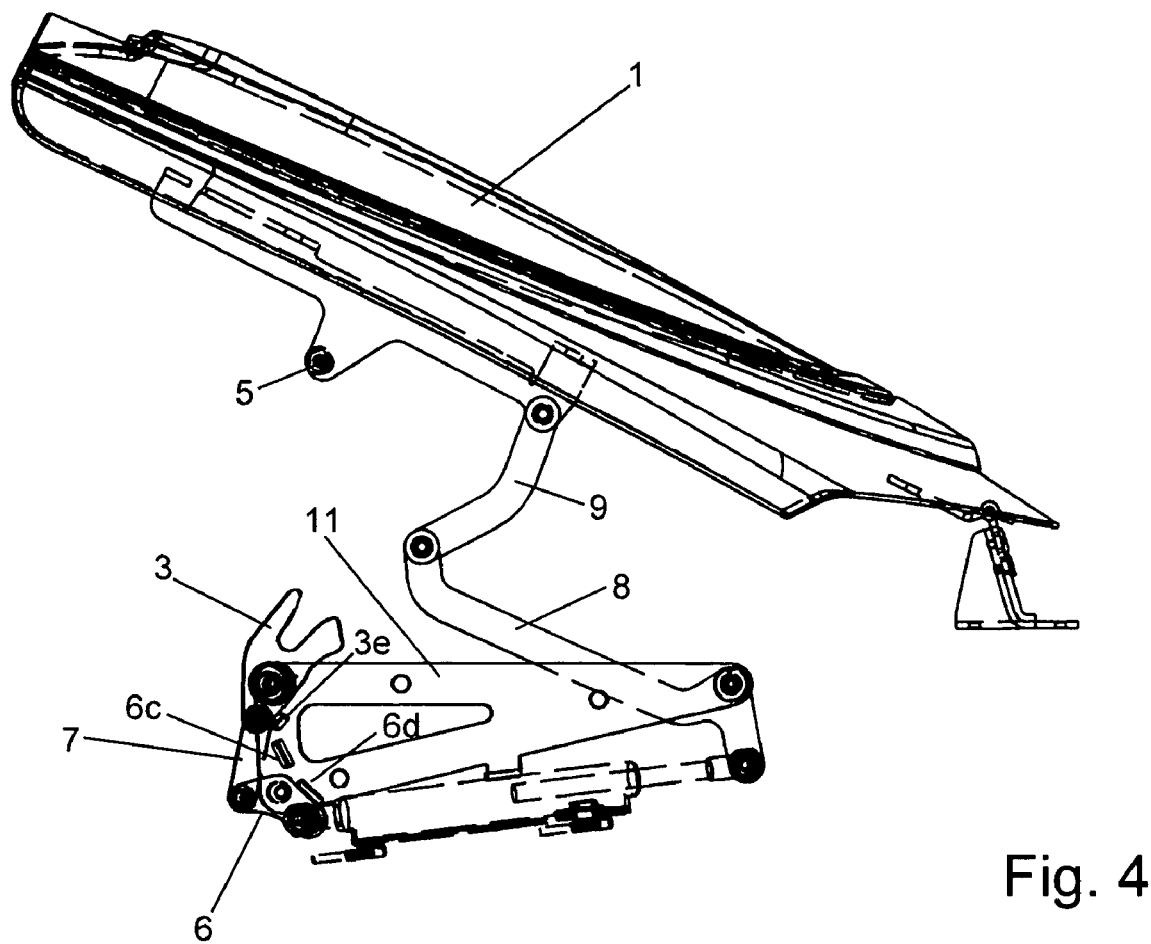
FIG. 4 shows the device from FIG. 1 in a third step of an opening movement.

A further contraction of the force transmission unit 2 leads to a pivoting of the first drive link 8 in the clockwise direction (FIG. 4) and thus to a swinging-open of the previously released trunk lid 1. The maximally open position is represented in FIG. 5.

Figure 5:
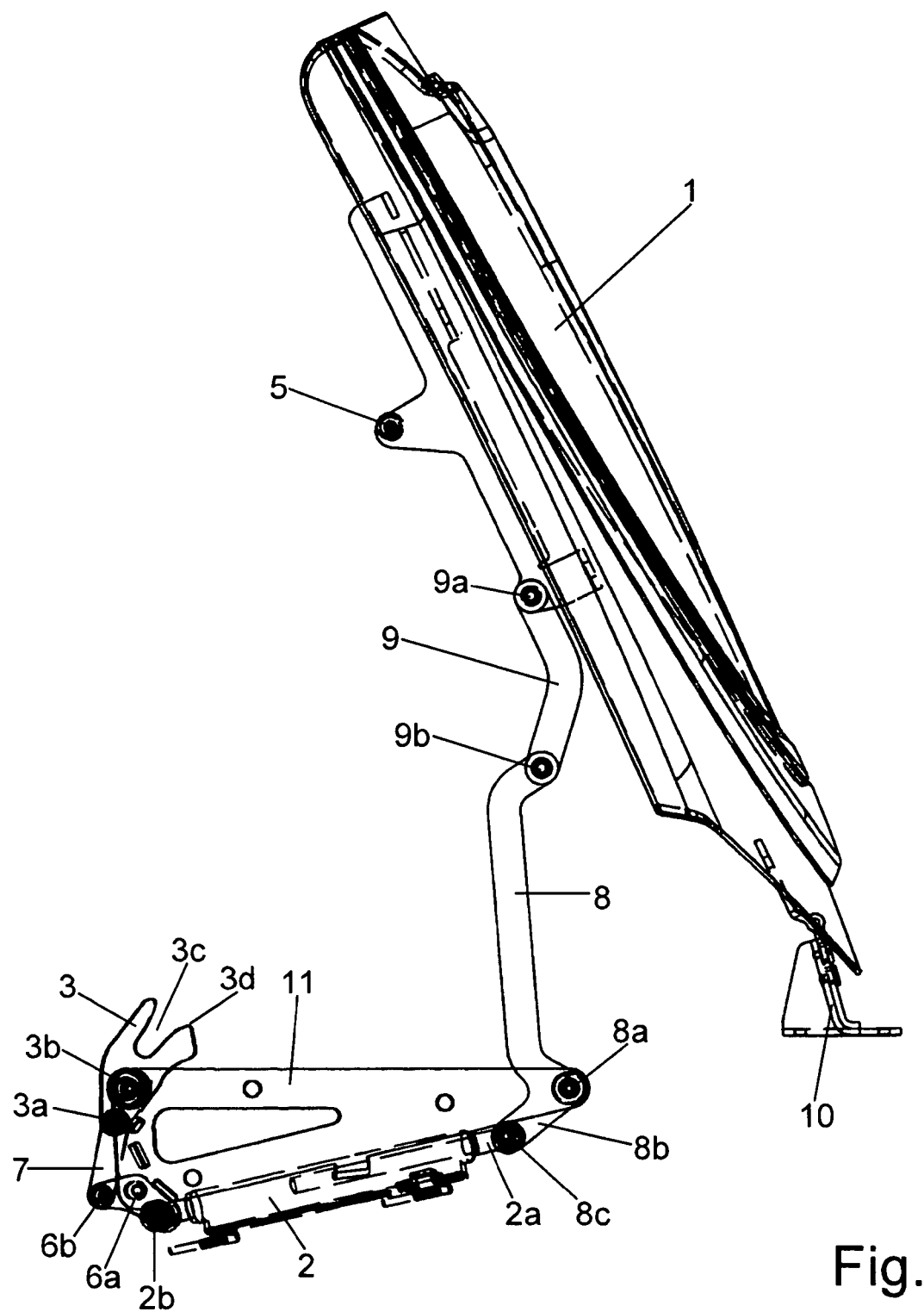
FIG. 5 shows the device from FIG. 1 in a fully open state.
Figure 6:
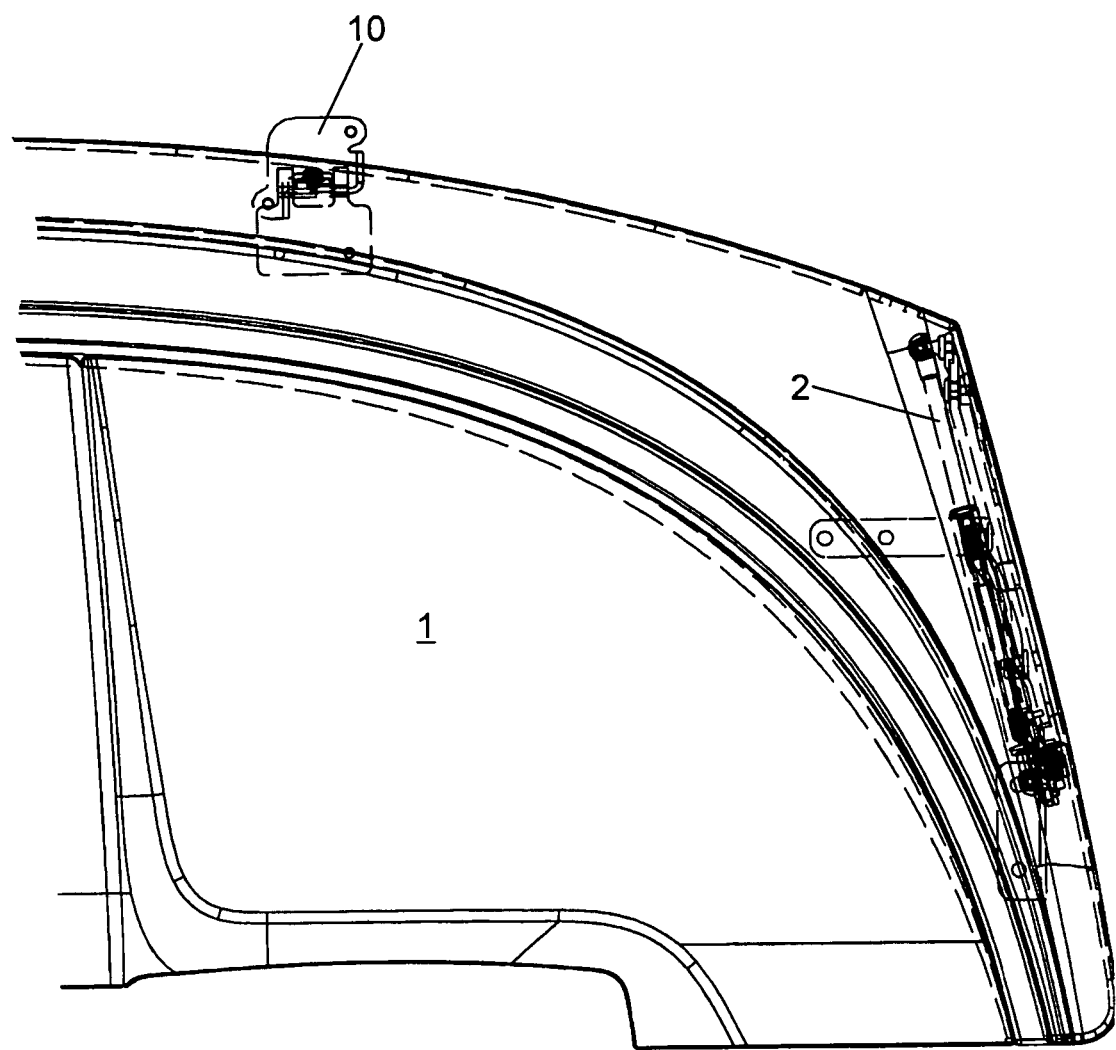
FIG. 6 shows a top view of a device according to the invention in a closed state from above.

FIG. 5 shows that the pivot lever 6 now bears against a second stop 6d, so that it is maximally twisted in the counterclockwise direction. In this position, the pivot latch 3, with respect to the control lever 7 and the pivot lever 6, is in a second over-center position assigned to the open state. In this position, the pivot latch 3 is prevented by a further stop 3e configured on the bearing unit 11 from twisting in the counterclockwise direction, which might otherwise give rise to an uncontrolled state of the link gear mechanism 4. The pivot latch is, additionally, tensioned by a torsion spring (not represented) in the clockwise direction, so that it is held in its open position.

An actuation, based on FIG. 5, of the force transmission unit 2 in the direction of extension of the push rod 2a does not therefore initially lead to pivoting of the pivot latch 3 in the clockwise direction, since its previously described over-center position of the open state prevents this.

Figure 3:
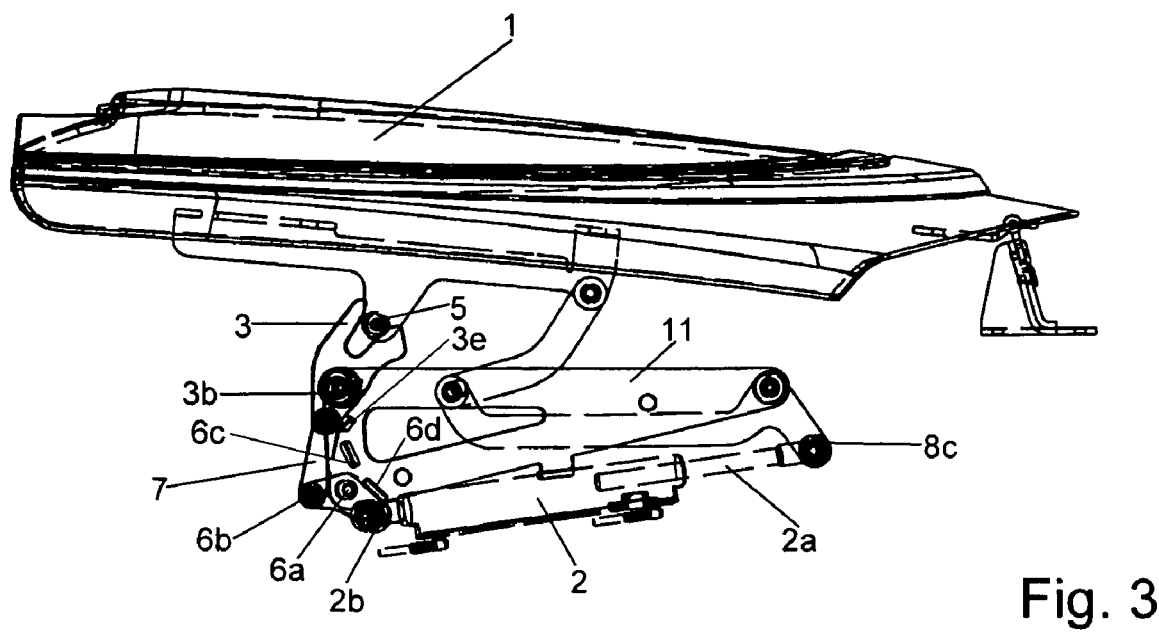
FIG. 3 shows the device from FIG. 1 in a second step of an opening movement.

Instead, in the course of an extension of the push rod 2a, only the trunk lid 1 is initially swung shut again until the catch bar 5 strikes the guideway 3d of the pivot latch 3 (state approximately according to FIG. 3). As a result of the impact of the catch bar 5, the pivot latch is moved somewhat in the clockwise direction, whereby the over-center position of the open state is surmounted.

A further extension of the push rod 2a now leads to a driven twisting of the pivot lever 6 in the clockwise direction and, conditioned by the control lever 7, also to a twisting of the pivot latch 3 in the clockwise direction. Since the catch bar 5 has previously struck the guideway 3d, it is necessarily in a suitable position for allowing the recess 3c of the pivot latch 3 to cooperate with the catch bar 5. A maximum extension of the push rod 2a leads, finally, to the closed position of the trunk lid 1 as described at the beginning, the pivot latch 3 once again being in an over-center position assigned to the closed state.

In particular, the previously described final portion of the closing movement also enables the trunk lid 1 to be pulled down by the pivot latch 3 under strong force. A resistance of the trunk lid 1 in its last motional portion, which resistance is roughly conditioned by seals, can hereby be surmounted without the force transmission unit 2 having to be excessively dimensioned.

In order to allow manual actuation of the fastening means 3 and thus also of the trunk lid 1 in the event of a failure of the force transmission unit 2, a manual emergency operation of the pivot lever 3 is preferably provided (not represented).

The over-center position of the open state additionally has the advantage, in the event of a failure of the force transmission unit 2, that the trunk lid cannot fall shut.

What is claimed is:

1. A device for covering a trunk of a motor vehicle, the device comprising
   - a trunk lid movable relative to a body of the vehicle,
   - a force transmission unit for driving the movement of the trunk lid,
   - a fastening means for releasably securing the trunk lid in a closed state of the trunk lid,
   - wherein the force transmission unit drives the movement of the trunk lid, and
   - wherein the force transmission unit drives the movement of the fastening means between an open and a closed state,
   - wherein the fastening means is connected by a link gear mechanism to the force transmission unit, and
   - wherein the link gear mechanism, in a closed state of the fastening means, is disposed in an over-center position.

2. The device as set forth in claim 1, wherein the link gear mechanism of the fastening means, in an at least partially open state of the trunk lid, is in an over-center position in relation to the force transmission unit.

3. The device as set forth in claim 1, wherein a lever of the link gear mechanism is articulately attached at a first support point to the force transmission unit, and wherein the lever is disposed rotatably about a joint on the body.

4. The device as set forth in claim 1, wherein the force transmission unit is articulately connected at a second support point to a first drive link for driving the movement of the trunk lid, and wherein the first drive link is mounted rotatably on the body about a first support point.

5. The device as set forth in claim 4, wherein a second drive link is articulately connected at one end, at a first swivel joint, to the first drive link, and at the other end, at a second swivel joint, to the trunk lid.

6. The device as set forth in claim 5, wherein the trunk lid is connected in a hinge joint to the body of the vehicle, and wherein the body, the trunk lid, the first drive link and the second drive link together form a four-bar mechanism.

7. The device as set forth in claim 5, wherein, in an open position of the trunk lid, the first support point, the first swivel joint and the second swivel joint are aligned essentially along a straight line.

8. The device as set forth in claim 1, wherein the fastening means is connected by a control link to the pivot lever.

9. The device as set forth in claim 1, wherein the fastening means is received on a bearing unit fixed to the body.

10. The device as set forth in claim 1, wherein the fastening means comprises a pivot latch, and wherein a catch bar connected to the trunk lid can be brought into engagement with the pivot latch.

11. The device as set forth in claim 10, wherein the catch bar, in the course of a closing movement of the trunk lid, hits the fastening means, and wherein the over-center position of the fastening means, which position is assigned to the open state, can be surmounted by the impact.

12. The device as set forth in claim 1, wherein the trunk lid is a folding-top compartment cover for covering an open convertible top, especially for covering an open so-called "retractable hard top".

13. The device as set forth in claim 1, wherein the trunk lid can be pivoted, for opening purposes, counter to a direction of travel of the motor vehicle.

14. A device for covering a trunk of a motor vehicle, the device comprising
   - a trunk lid movable relative to a body of the vehicle,
   - a force transmission unit for driving the movement of the trunk lid,
   - a fastening means for releasably securing the trunk lid in a closed state of the trunk lid,
   - wherein both the fastening means and the movement of the trunk lid can be driven by means of the force transmission unit,
   - wherein the fastening means is connected by a link gear mechanism to the force transmission unit, and
   - wherein a lever of the link gear mechanism is articulately attached at a first support point to the force transmission unit.

15. The device as set forth in claim 14, wherein the lever is disposed rotatably about a joint on the body.

16. The device as set forth in claim 14, wherein the force transmission unit is articulately connected at a second support point to a first drive link for driving the movement of the trunk lid, and wherein the first drive link is mounted rotatably on the body about a first support point.

17. The device as set forth in claim 16, wherein a second drive link is articulately connected at one end, at a first swivel joint, to the first drive link, and at the other end, at a second swivel joint, to the trunk lid.

18. The device as set forth in claim 17, wherein the trunk lid is connected in a hinge joint to the body of the vehicle, and wherein the body, the trunk lid, the first drive link and the second drive link together form a four-bar mechanism.

19. The device as set forth in claim 17, wherein, in an open position of the trunk lid, the first support point, the first swivel joint and the second swivel joint are aligned essentially along a straight line.

20. The device as set forth in claim 14, wherein the trunk lid is a folding-top compartment cover for covering an open convertible top, especially for covering an open so-called "retractable hard top".

21. The device as set forth in claim 14, wherein the trunk lid can be pivoted, for opening purposes, counter to a direction of travel of the motor vehicle.

22. The device as set forth in claim 14, wherein the link gear mechanism, in a closed state of the fastening means, is disposed in an over-center position.

* * * * *